United States Patent [19]

Knappe

[11] Patent Number: 5,012,950
[45] Date of Patent: May 7, 1991

[54] PLASTIC CONTAINER FOR LIQUIDS OR GASES

[76] Inventor: Holger Knappe, Ringstrasse, 2061 Grabau, Fed. Rep. of Germany

[21] Appl. No.: 343,640

[22] Filed: Apr. 27, 1989

[30] Foreign Application Priority Data

Apr. 30, 1988 [DE] Fed. Rep. of Germany ....... 3814699
Apr. 14, 1989 [DE] Fed. Rep. of Germany ....... 3912270

[51] Int. Cl.$^5$ ............................................. B65D 90/04
[52] U.S. Cl. .................................. 220/459; 126/373; 220/3; 220/565
[58] Field of Search ................. 126/361, 373; 219/312; 220/1 B, 3, 83, 453–455, 459, 468, 565

[56] References Cited

U.S. PATENT DOCUMENTS

| 3,132,761 | 5/1964 | Sylvester | 220/455 |
|---|---|---|---|
| 3,508,677 | 4/1970 | Laibson et al. | 220/3 |
| 3,608,204 | 9/1971 | Ashby | 220/455 |
| 3,874,544 | 4/1975 | Harmon | 220/3 |
| 3,908,851 | 9/1975 | Jacobs | 220/3 |
| 4,112,644 | 9/1978 | Allen | 220/83 |
| 4,191,304 | 3/1980 | Schiedat | 220/3 |
| 4,660,738 | 4/1987 | Ives | 220/1 B |
| 4,690,295 | 9/1987 | Wills | 220/3 |
| 4,785,956 | 11/1988 | Kepler et al. | 220/3 |

Primary Examiner—Jimmy G. Foster
Attorney, Agent, or Firm—Cushman, Darby & Cushman

[57] ABSTRACT

The invention relates to plastic containers for liquids and gases, which are characterized in that they have a seamless inner layer of modified PPO or PP and a glass fiber layer following it, laid on geodesic lines and provided partly or completely with reaction resins or thermoplastics as well as an optional outer coating of hardenable reaction resins or thermoplastics. In regions of particular strain, the plastic containers may have, between the liner and the glass fiber layer comprising long fibers, an intermediate layer of thermoplastics or reaction resins not having containing monomeric styrene and with approximately 20 to 40% by weight of glass fibers in the form of short fibers.

11 Claims, 1 Drawing Sheet

PLASTIC CONTAINER FOR LIQUIDS OR GASES

BACKGROUND OF THE INVENTION

The invention relates to plastic containers for liquids or gases.

Composite materials, that is, laminated bodies made of various plastics, are already known, and in many fields they have replaced the materials previously typically used. However, it has not yet been possible to use such composite plastics or sandwich materials for all fields of application, because either their mechanical properties or other characteristics did not allow their use in place of metal or ceramic materials. Among these fields of application are for instance the manufacture of water tanks, in particular hot-water heaters or tanks for other aqueous liquids, which to a large extent are still today made of enameled steel. Enameled steel tanks are markedly vulnerable to corrosion, however, because hairline cracks form in the enamel film, and the equipment undergoes considerable corrosion relatively quickly at temperatures of approximately $60\frac{1}{2}°$ C. or below. Experience has shown that such water tanks of steel last for only about 2 to 3 years and then must be replaced because of corrosion damage. It is already known from German Patent Application No. DE-OS 33 42 386, however, that instead of steel tanks, tanks made of plastic can be used; these tanks comprise an inner layer of modified polyphenylene oxide, i.e., PPO, and an outer layer of glass-fiber-reinforced polyester resin. The glass-fiber-reinforced polyester resins have a glass fiber content of approximately 25 to 30%, and in special cases approximately 60 to 80%. Practical tests have shown that such storage containers have a considerably longer service life than metal storage tanks and sometimes can be used for up to 10 years without corrosion. This is all the more unexpected since it is known per se that polyphenylene oxide (PPO) has only a very low water absorption capacity, yet at higher temperatures an oxidative destruction is nevertheless ascertainable. Despite the elevated temperature typical in the tanks, however, it has been found that PPO in the modified form has excellent resistance to oxidation and hydrolysis when used as an internal liner.

In long-term tests of the above-described plastic containers used as tanks, however, it has been found that unexpectedly, embrittlement of the PPO inner liner was ascertainable after relatively long use, which if the container is stressed by jarring or vibration, as can for instance happen even from traffic on busy streets, can lead to hairline cracks and hence to leaking of the container. Only with extensive tests was it possible to ascertain that the cause is the styrene content that the customary polyester reaction resins available in commerce have as a rule. The unpolymerized styrene in the outer laminate layer attacks the PPO liner and hence causes an impairment of its mechanical properties.

It is therefore the object of the invention to develop plastic containers of the above-described type that do not have the demonstrated disadvantages and which are suitable as tanks, particularly as hot water heaters and also as unpressurized containers, particularly the so-called expansion tanks for hot water heating systems.

BRIEF DESCRIPTION OF THE INVENTION

To attain this object, plastic containers for liquids or gases are proposed that are characterized by a seamless inner liner of modified PPO or polypropylene, i.e., PP, followed by a glass fiber layer laid out on approximately geodesic lines, and an outer coating of hardenable reaction resins or thermoplastics.

It has unexpectedly been ascertained that the tensile and bending strength necessary for containers of the above type, especially when they are pressure tanks or giant containers, does not depend as assumed on the fiber-reinforced polyester but instead is already attainable by means of glass fibers themselves, if they are wound in such a way that at every point on the container wall the tensile and bending strain is kept as low as is technically possible. The coating of hardenable reaction resins or thermoplastics applied as an outer layer thus serves, not generally to provide stability to the container, but instead essentially merely to fix the glass fiber winding in the given position. Hence it is also unnecessary for the reaction resin to have particularly high tensile strength and bending strength, because the pressures that arise are absorbed by the glass fiber jacket, and the resin serves merely as an outer stabilization of precisely the glass fiber jacket.

DETAILED DESCRIPTION OF THE INVENTION

The manufacture of the plastic containers according to the invention is effected in that the liner of modified PPO, which is for instance available in commerce from General Electric under the trade name "Noryl", is produced in a manner known per se by extrusion blow molding. After the flanges, connections and so forth are in place, which need not be glued or welded, the liner is used as a core in the winding process. Rotationally symmetrical shaped bodies such as the containers in question here, as well as shaped bodies of more-complicated design, are wound in a known manner with planetary winding machines having three-dimensional numerically controlled filament winding. The essential feature is that the glass fibers are laid on approximately geodesic lines, so as to attain as uniform as possible a tensile and bending strength at every point of the container. Geodesic lines are lines of vanishing curvature over a surface in the three-dimensional euclidic space. There are surface curves $c(t) = [f \circ u](t)$ of a surface $f: U - R^3$ ($U \leq R^2$, $u(t) = (u^1(t), u^2(t))$), which are characterized by the following properties: $C(t)$ is a curve of vanishing geodesic curvature. $U(t)$ satisfies the differential equations for geodesic lines:

$$U^k(t) + \Gamma u^i(t)\, rij^k \circ u(t) = 0,$$

where $$u(t) = \frac{d\, u(t)}{dt}$$

and $rij^k$ are the Christoffel symbols of the second kind, in classical area theory.

The location of the geodesic line is naturally oriented to the shape of the particular body and must be suitably calculated and programmed. For better fixation of the fibers, a cross-wound winding can be provided over the liner or as a cover of the glass fiber layer. The thickness of the thus-wound glass fiber jacket depends on the expected pressure load; with unpressurized containers, a single-layer glass fiber layer suffices as a rule, while for pressure tanks, depending on requirements prescribed by law, a thickness of the glass fiber layer must be planned for that has compressive and bending strengths approximately 2 to 10 times as high as the maximum pressure to be expected. For hot-water tanks, as a rule, a margin of safety of five times the maximal pressure is assumed.

The final fixation of the glass fiber jacket can be accomplished in two ways; for instance, the fiber strands can be saturated with resin or thermoplastic in a continuous bath in the winding process and then wound under tension onto the rotating shaped body. This can always be done for instance whenever reaction resins that do not contain any styrene in the so-called premixes are used. If the fixation is to be done with unsaturated polyester resins, then first a layer of glass fibers without resin additive is wound on, and only with the second layer is a saturation of the fiber strands with resin performed. In this way, the monomeric styrene present in the premixes is kept from being able to come into contact with the PPO or PP liner where it could cause embrittlement. Reaction resins that can be used, besides the unsaturated polyesters, include epoxide resins, reactive polymetlylmethacrylate (PMMA) resins or isocyanate resins. Processing is done in a manner known per se, with the addition of catalysts and accelerators. If desired, the outer fiber layer can also be saturated with reaction resins suitable for the production of expanded plastic, so that an expansion of these resins can subsequently be performed by irradiation or temperature elevation. The outer layer of the fiber jacket, which serves to fix the fibers, may for instance comprise a modified PPO foam, if for particular reasons an increased stability to thermal and hydrolytic strains is for instance desired. However, fixation with thermoplastics is also possible, either by saturating fibers with heated thermoplastics in the bath, or by applying these thermoplastics subsequently to the fiber layer.

The plastic containers according to the invention may be used as tanks for aqueous or non-aqueous liquids or for gases, especially in this case for moist gases, because they are particularly suitable as pressure tanks and with a suitable design of the glass fiber jacket can withstand pressures of up to 100 bar. Because of the chemical inertness and the thermal and hydrolytic stability, the containers are above all usable for applications in which long-term thermal strain under pressure from aqueous solutions is to be expected, an example being water tanks and in particular hot-water heaters. Tests performed thus far have clearly shown that because of the specialized design of the composite material any embrittlement of the liner is avoided, and in this way water tanks can be produced that withstand a continuous test load that is equivalent to a normal load of well over ten years in domestic or industrial use.

These tests have also found, in particular, if the containers are used as pressure tanks for moist gases, that the liner or the inner layer in some cases should preferably not comprise PPO or PP as a single-layer system, but rather that under certain conditions, multilayer systems that do contain PPO and other thermoplastics can preferably be used. 10 Without changing the pressure and strain behavior otherwise, it is possible in special cases, for instance with moist gases, for the PPO liner to be replaced with a liner of other thermoplastics having better resistance to aggressive moist gases; suitable plastics for the inner layer may optionally be PTFE, i.e., polytetrafluoroethylene; PCTFE, i.e., polychlorotrifluoroethylene; PSU, i.e., polysulfones; or PI, i.e., polyimides. Preferably, however, in that case, these plastics are used with PPO as multilayer systems. An important factor in this connection as well, however, is the fact that, as described above, the inner layer or in other words the liner is seamless; that is, it has neither a weld seam nor a pinched seam at which an attack of aggressive liquids could occur.

It has also been found that with pressure tanks subjected to severely fluctuating pressures it may be advantageous for a kind of buffer layer comprising a matrix of reaction resins or thermoplastics not containing monomeric styrene, but with a glass fiber content in the range from approximately 20 to 40% by weight in the form of short fibers (relative to the length of the glass fibers in the outer layer) to be laid between the liner and the glass fiber layer comprising long fibers. The term styrene-free is understood in this connection to mean a thermoplastic or a reaction resin that after curing contains only such amounts of monomeric styrene as technically cannot readily be removed. Grades of foodstuffs that depending on the copolymers may still have a content of monomeric styrene and other volatile compounds up to a maximum of 0.5 to 0.6% are considered to be styrene-free in the technical sense.

This "buffer layer" absorbs extreme pressure strains that for instance with flanges of metal could cause the metal edges, with highly fluctuating and sometimes very high pressures, to cut into the glass fiber layer in such a way that some of the glass fibers would be destroyed and thus the overall strength of the container could be reduced. The relatively soft buffer layer comprising thermoplastics or reaction resins and a relatively low proportion of short fibers absorbs such extreme strains.

If the containers according to the invention are used as unpressurized containers, then naturally such a buffer layer need not be present. It has also been found that with unpressurized containers, which after all are subjected to a lesser strain, the geodesy of the glass fiber layer need not be observed so strictly as with pressure tanks, so that in those cases winding of the glass fiber layer can be done in such a way that a greater deviation from the mathematically correct geodesy is possible than in the case of pressure tanks. However, it has proved advantageous in that case as well to apply a cross-wound winding on the liner or as an outer covering of the jacket.

DESCRIPTION OF THE DRAWINGS

The invention will now be described in further detail in conjunction with the drawings.

Figure 1:
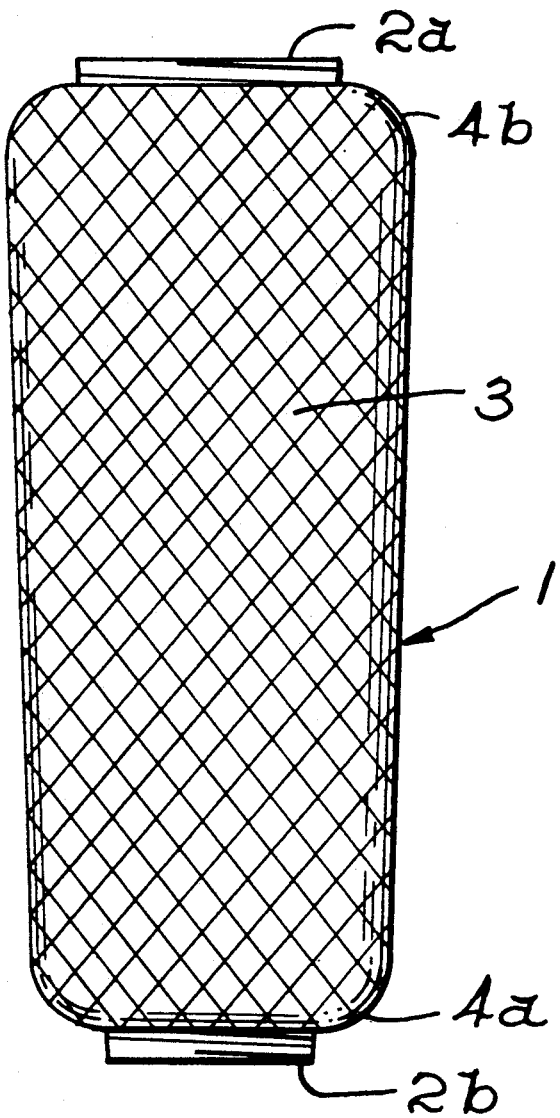
FIG. 1 shows a hot-water tank according to the invention in a plan view.
Figure 2:
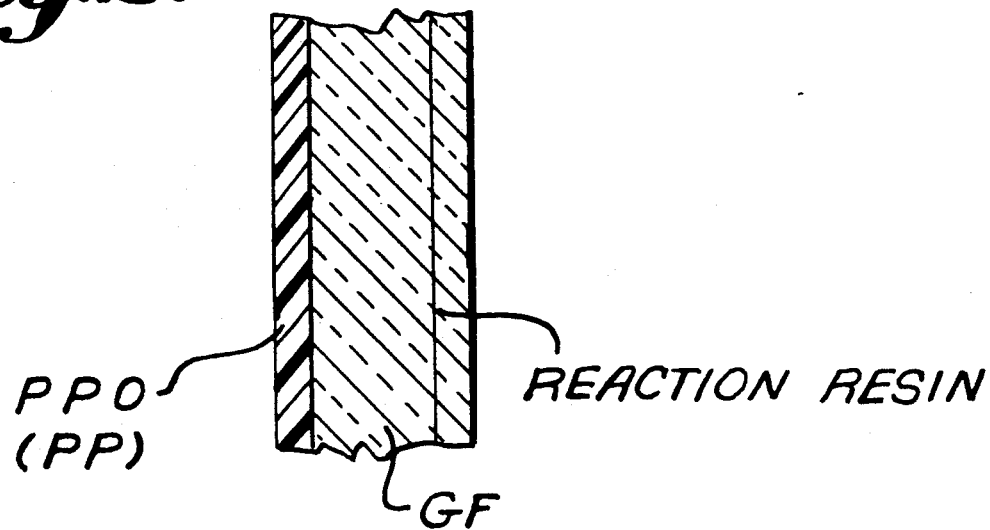
FIG. 2 is a schematic cross section through the tank wall in a preferred embodiment.

The tank 1 comprises the liner which may have a plurality of layers, not visible, as well as a glass fiber layer 3, which is provided on its surface with a layer of reaction resin. There may be a layer (not visible) intermediate the liner and the fiber glass layer, of thermoplastics or reaction resins containing short glass fibers. The container is equipped with flanges 2a, 2b at both ends, which are not secured separately but instead are joined to the line by the winding of the glass fibers. The winding is effected on approximately geodesic lines, which also produce the enlargements 4a and 4b at the shoulders of the container. This winding is adjoined by a cross-wound winding that can be seen from the outer surface.

In a preferred embodiment, the wall of the container comprises a PPO or PP inner layer or liner, which is followed by a glass fiber layer, the outer covering of which is in turn formed by a layer of reaction resin.

EXAMPLE

In a hot-water heater with a capacity of 100 liters, a suitable seamless liner of modified PPO having a wall thickness of 2 mm is produced by extrusion blow molding. Preferably, the method is performed such that the flanged rings and the closed form are extruded through and then the hose is pinched off outside the die. As a result, undercuts can simultaneously be produced, which encompass the flanged extruded segment and, when the 0-ring is introduced, make it impossible for the liner to be forced out of the ring. Next, in a manner known per se, a single layer is applied as a cross-wound winding and the further layers of the glass fibers are applied on approximately geodesic lines, using a planetary winding machine with three-dimensional numerically controlled filament winding. Part of this fiber jacket is provided as a buffer layer and thus has a thickness of approximately 0.4 mm. As the application of the glass fibers continues, fibers saturated with reaction resin such as polyester resin are then used, up to a layer thickness of a further 0.6 mm, so that the fiber jacket, including the outer polyester layer, has a total thickness of approximately 1 mm.

This hot-water heater is designed for a pressure over long-term use of 10 bar and a test pressure of 30 bar. The tests showed that the bursting pressure was approximately 124 bar.

What is claimed is:

1. A plastic container comprising a seamless liner, as an inner layer, of modified polyphenylene oxide and an outer glass fiber layer wound on approximately geodesic lines on said liner, wherein said outer layer has a coating of thermoplastics or reaction resins, wherein said reaction resins are at least one of polyester resins, or unsaturated polyester resins not containing monomeric styrene.

2. A plastic container comprising a seamless liner, as an inner layer, of modified polyphenylene oxide said inner layer wrapped with an outer layer of glass fibers wherein the outer layers of glass fibers are spaced apart from said seamless inner layer and contain thermoplastics or hardenable reaction resins, wherein said hardenable reaction resins are at least one of polyester resins or unsaturated polyester resins.

3. A plastic container of claims 1 or 2 further including a layer of cross-wound winding intermediate said inner seamless layer and said outer glass fiber layer.

4. A plastic container of claims 1 or 2 further including a layer of cross-wound winding covering said outer glass fiber layer.

5. A plastic container comprising a seamless liner, as an inner layer, of modified polyphenylene oxide or polypropylene, and an outer glass fiber layer wound on approximately geodesic lines on said liner, wherein said outer layer has a coating of thermoplastics or reaction resins not containing monomeric styrene, and said seamless liner comprising at least one layer comprised of modified polyphenylene oxide or polypropylene, and at least one other thermoplastic.

6. A plastic container comprising a seamless liner, as an inner layer, of modified polyphenylene oxide or polypropylene, said liner wrapped with an outer layer of glass fibers wherein the outer layers of glass fibers are spaced apart from said liner and contain thermoplastics are hardenable reaction resins, and said seamless liner comprising at least one layer comprised of modified polyphenylene oxide, or polypropylene, and at least one other thermoplastic.

7. A plastic container of claim 5 or 6 wherein said thermoplastic is at least one of polytetrafluoroethylene, polychlorotrifluoroethylene or polyimide.

8. A plastic container comprising a seamless liner, as an inner layer, of modified polyphenylene oxide and an outer glass fiber layer wound on approximately geodesic lines on said liner, wherein said outer layer has a coating of thermoplastics or reaction resins and said reaction resins are at least one of polyester resins, or unsaturated polyester resins not containing monomeric styrene, and further including a layer, intermediate said liner and said outer glass fiber layer, of thermoplastics or reaction resins not containing monomeric styrene and containing approximately 20 to 40% by weight of short glass fibers.

9. A plastic container comprising a seamless liner, as an inner layer, of modified polyphenylene oxide said inner layer wrapped with an outer layer of glass fibers wherein the outer layers of glass fibers are spaced apart from said seamless inner layer and contain thermoplastics or hardenable reaction resins, and further including a layer, intermediate said liner and said outer glass layer, of polyester resins or unsaturated polyester resins not containing monomeric styrene and containing approximately 20 to 40% by weight of short glass fibers.

10. A plastic container comprising a seamless liner, as an inner layer, of modified polyphenylene oxide or polypropylene, and an outer glass fiber layer wound on approximately geodesic lines on said liner, wherein said outer layer has a coating comprising polypropylene or modified polyphenylene oxide foam saturated glass fiber wherein said outer layer does not contain monomeric styrene.

11. A plastic container comprising a seamless liner, as an inner layer, of modified polyphenylene oxide or polypropylene, said inner layer wrapped with an outer layer of glass fibers wherein the outer layer of glass fibers are spaced apart from said seamless inner layer and contain polypropylene or modified polyphenylene oxide foam saturated glass fiber.

* * * * *